United States Patent [19]

Mette

[11] Patent Number: 4,787,300

[45] Date of Patent: Nov. 29, 1988

[54] APPARATUS FOR CONTINUOUSLY COOKING AND/OR DEHYDRATING FOODSTUFFS

[75] Inventor: Manfred Mette, Hamburg, Fed. Rep. of Germany

[73] Assignee: Nordischer Maschinenbau Rud. Baader GmbH + Co KG, Lubeck, Fed. Rep. of Germany

[21] Appl. No.: 12,845

[22] Filed: Feb. 10, 1987

[30] Foreign Application Priority Data

Feb. 15, 1986 [DE] Fed. Rep. of Germany ....... 3604808

[51] Int. Cl.[4] .......................... A23L 1/01; A23L 3/02
[52] U.S. Cl. .................................. 99/330; 99/443 C; 99/470; 99/536
[58] Field of Search ................ 99/330, 361, 362, 367, 99/368, 443 C, 470, 517, 536

[56] References Cited

U.S. PATENT DOCUMENTS

| | | | |
|---|---|---|---|
| 1,127,634 | 2/1915 | Kerber | 99/361 |
| 1,419,139 | 6/1922 | Hunter | 99/362 |
| 3,445,179 | 5/1969 | Jansen | 99/362 X |
| 3,469,988 | 9/1969 | Yawger | 99/362 X |
| 3,699,875 | 10/1972 | Wilson | 99/362 X |
| 4,346,650 | 8/1982 | Zaitsu | 99/361 |

FOREIGN PATENT DOCUMENTS 2569533 3/1986 France .

Primary Examiner—John M. Jillions
Attorney, Agent, or Firm—Thomas R. Morrison

[57] ABSTRACT

The invention concerns a process and an apparatus for the continuous heat treatment of foodstuffs. Unlike in known cooking or boiling installations with a substantially homogeneous temperature control of the heat carrier in the form of water, a multizone installation comprising preheating, boiling and recooling zones is suggested, through which the foodstuffs to be treated are passed successively. The heat carrier is conducted through the recooling zone in a direction counter to the conveying direction and then, bypassing the boiling zone, is supplied to the preheating zone leading to a temperature rise in the latter due to the thermal energy passing to the heat carrier during the recooling process. The energy demand is covered by the heat supplied to the boiling zone, which also operates in the countercurrent principle with the aid of circulating means.

20 Claims, 4 Drawing Sheets

APPARATUS FOR CONTINUOUSLY COOKING AND/OR DEHYDRATING FOODSTUFFS

BACKGROUND OF THE INVENTION

1. Field of the Invention

The invention relates to an apparatus for continuously processing foodstuffs under atmospheric pressure for the purpose of finishing (cooking or boiling) and/or dewatering them by contact with a heat carrier in the form of water, the apparatus comprising an installation having at least one separate preheating, boiling and recooling zone, each, of which zones includes a trough and, each being provided with chambers and traversed by means for conveying the treatment material, heat exchange means for transferring the thermal energy to be supplied to the heat carrier, means for supplying and removing the heat carrier and means for conveying the heat carrier within the installation.

2. Prior Art

Such apparatus is used in the industrial preparation of foodstuffs by heat treatment. Thus, they are e.g. used for finishing (boiling) all types of cooked sausage, vacuum-packaged sausage, collectively blister-packed sausage, takeaway meals in sealed plastic containers, fish products and the like products, or e.g. also for blanch all types of cabbage and bulbous or tubereous vegetables.

The temperature control is of decisive influence for the economical operation of such installations and is also of prominent importance with regard to maintaining the quality of the material to be treated. In order to avoid quality-reducing, punctiform overheating of the treatment material, efforts have been directed not only at precisely controlling the temperature, but also ensuring that the same temperature prevails throughout the water bath.

This processing is disadvantageous in many respects. Thus, in finishing processes it is, in most cases, desired to obtain as homogeneous as possible a temperature distribution in the product to be cooked, so that a temperature becomes effective on all parts of the cross-section which, at least, does not differ significantly from the temperature found to be favourable e.g. from the nutrition-physiological and sensory standpoints. However, particularly for economical reasons, a much higher temperature than the aforementioned one is normally used for the purpose of obtaining the desired core temperature more rapidly, i.e. to achieve a higher throughput due to shorter transit times, but this also leads to the material to be finished being overheated in its marginal regions before the core temperature has reached the desired value. Apart from the quality reduction mentioned in this context, this handling leads to a higher breaking or splitting rate, particularly in the case of sensitive packing casings, e.g. sausages with casings made from predetermined intestine qualities, during the heat treatment as a result of the increased stressing which consequently occurs in the material to be boiled. In addition, the energy balance is not good due to the heat losses which increase exponentially with the temperature.

An apparatus based on these ideas and perceptions is disclosed in FR-PS 2 569 533. This apparatus shows a tunnel-shaped structure and comprises a series of chambers separated from each other by doors, through which the material to be boiled, e.g. ham, which is in the boiling containers is conveyed by means of an intermittently driven trolley conveyor. The material to be boiled is first immersed in a hot bath, then it is left for a predetermined time without the supply of thermal energy for the purpose of temperature compensation between the marginal and the core temperatures, and finally it is slowly raised with respect to its temperature under moisture-chamber atmosphere during its passage through several treatment chambers, before it is recooled by immersion in low temperature water.

This known apparatus is provided as an architechtonic component of a production plant.

3. Objects of the Invention

It is an essential object of the invention to suggest a compact apparatus making it possible to subject foodstuffs to a continuous heat treatment using water as the heat carrier. It is another important object of the invention to ensure that the treatment takes place in an optimum manner taking account of the nutrition-physiological and sensory demands. It is yet a further major object of the invention to enable that the process be performed automatically with a view to minimizing operating costs.

SUMMARY OF THE INVENTION

In an apparatus comprising an installation having separate preheating, boiling and recooling zones, in each of which troughs are installed provided with chambers and traversed by means for conveying the treatment material, and further comprising heat exchange means for transferring the thermal energy to be supplied to the heat carrier, means for supplying and removing the heat carrier, and means for conveying the heat carrier within the installation, these objects are achieved in that the means for supplying the heat carrier are provided in the outlet region of the recooling zone and the means for removing the heat carrier are provided in the inlet region of the preheating zone, that the inlet region of the recooling zone is connected with the outlet region of the preheating zone by a pipe conduct, in which is intermediately arranged a feed pump as means for supplying the heat carrier, this pump being controlled in accordance with the supply quantity of the heat carrier into the recooling zone, and that the heat exchange means are installed in the boiling zone.

Thus, it is ensured that, in accordance with the objects of the invention, the thermal energy taken from the treatment material in the recooling zone and transferred to the heat carrier in this zone is used for raising the temperature of the heat carrier in the preheating zone, i.e. a countercurrent effect is obtained, by which a preheating of the treatment material is made possible in this zone without any additional energy supply. The heat transfer can be made more intense in that the supply of the heat carrier to the recooling zone and the transfer of the heat carrier removed from said zone into the preheating zone in each case takes place by means of sprinklers (showers), which sprinkle the foodstuffs to be treated from all sides by means of jets or nozzles. Simultaneouly, this brings about a washing process enabling any contaminations adhering to the treatment material to be removed. In order to provide the advantageous countercurrent effect in the boiling zone as well, it is provided that the inlet region of the boiling zone has a side chamber receiving the heat exchange means, to which side chamber is connected a circulating pump for removing the heated heat carrier and for supplying the same into the outlet region of the boiling zone and that the side chamber is connected to the inlet region of the boiling zone via an overflow. Thus, a temperature profile results in the boiling zone which has the highest temperature in the outlet region, so that the treatment material is subjected to a slowly increasing temperature effect. For the purpose of continuously cleaning the heat carrier a device for discharging solids can be provided at least in the outlet region of the boiling zone.

A cost-favourable construction is obtained if the means for feeding the foodstuffs to be treated comprise a driven, endlessly circulating conveyor, which passes through all the treatment zones.

With a view to further improving the economical efficiency, it can be advantageous, however, if the conveying means comprise individual synchronously driven conveyors, each of which circulates endlessly, is separately associated with the individual treatment zones and passes through the latter. It will be apparent that such an arrangement avoids the conveying elements having to pass through the temperature profile of the complete installation in each case, i.e. have to be heated by corresponding additional energy like the foodstuffs to be treated, and recooled, respectively.

For controlling the treatment process, control means are provided for controlling the feed pump with respect to its capacity, the heat carrier supply with respect to the flow rate and the means for feeding the treatment material with respect to their speed. The control takes place in that a detection is performed of the flow rate of the heat carrier, of the thermal energy supplied, of the inlet and outlet temperatures of the heat carrier in the boiling zone and of the speed of the means for conveying the foodstuffs to be treated, the data obtained thereby being supplied as process data to a computer, which controls the teatment process in accordance with a predetermined optimization program with regard to minimizing the operating costs, use being made of a predetermined reference value for the temperature difference in the boiling bath and/or the throughput represented by the speed of the means for conveying the foodstuffs to be treated as orientation parameters.

Finally, heat exchange means may be provided in each one of the treatment zones, for improving the starting conditions of the installation, which means make it possible, prior to initiating operation, to bring each treatment zone separately to approximately the temperature level ensuing during the operation of the installation.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

Figure 1:
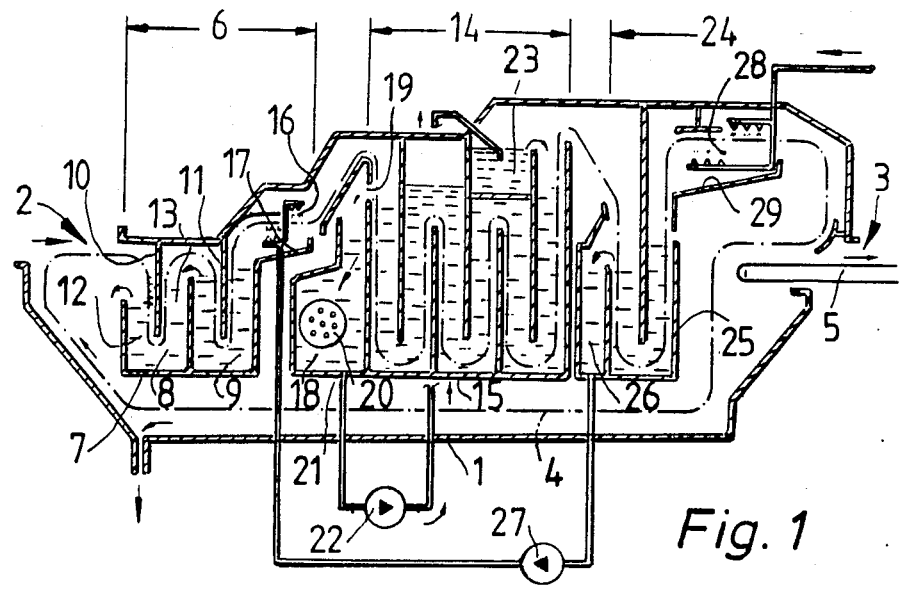
FIG. 1 shows a diagrammatic representation of the heat treatment installation.

According to FIG. 1 the complete installation is surrounded by a suitably designed housing 1, which has an inlet zone 2 for the foodstuffs to be treated and an outlet zone 3 for the discharge thereof. An endlessly circulating conveyor 4 driven by an appropriate controlled drive is provided for taking over the foodstuffs to be treated, which conveyor passes through the complete installation and is guided in the necessary manner by suitable reversing means. The conveyor 4 is provided with not shown reception elements for the foodstuffs to be treated, in the form of seesaw-like, perforated baskets, which are fixed to the conveyor 4 at regular intervals. A discharge conveyor 5 constituted by a perforated conveyor belt is associated with the outlet zone 3, over which discharge conveyor there is arranged a not shown reversing station for the overhead guidance of the baskets and therefore for transferring the finished material to the discharge conveyor 5. The inlet zone 2 is followed by a preheating zone 6 comprising a trough (tank) 7, which is e.g. subdivided into two chambers 8 and 9, each of which is in turn subdivided into partial chambers 12 and 13 by partitions 10 and 11 immersing therein, these partitions ending at a distance above the bottom of the trough 7 leaving a passage for the conveyor 4. The mentioned reversing means guide the conveyor 4 in such a way that the baskets descend into the first partial chamber 12 and then, after traversing said passage, ascend again in the second partial chamber 13, in order to pass through the second chamber 9 in the same way. A boiling zone 14 follows the preheating zone 6 and comprises a trough (tank) 15 with e.g. three chambers, which are subdivided in accordance with the trough 7 of the preheating zone 6 and allow the passage of the conveyor 4. In the transition region between the preheating zone 6 and the boiling zone 14, there is provided a sprinkler (shower) 16, whose nozzles or jets are directed against the conveyor 4 and below which sprinkler there is a guide plate 17 extended into the outlet region of the preheating zone 6. Upstream of the inlet region of the boiling zone 14 there is arranged a side chamber 18, into which the first partial chamber of the boiling zone 14 issues with an overflow 19 and in which suitable heat exchange means 20, e.g. supplying the thermal energy by means of steam, are located. The side chamber 18 has an outflow 21 at its bottom. A circulating pump 22 is connected to the outflow as the means for conveying the heat carrier located in the side chamber 18 and which issues into a mixing chamber 23 overflowing into the outlet region of the boiling zone 14. The boiling zone 14 is followed by a recooling zone 24 comprising a trough (tank) 25 with e.g. two chambers, which are subdivided in accordance with the trough 7 of the preheating zone 6 and allow for a passage of the conveyor 4. Upstream of the recooling zone 24 there is provided a collecting chamber 26 into which the first partial chamber of the recooling zone 24 overflows. The collecting chamber 26 supplies a feed or conveying pump 27, which operates the sprinkler 16 in the outlet region of the preheating zone 6. A sprinkler (shower) 28 is provided in the outlet region of the recooling zone 24 and in the vicinity of the outlet zone, which sprinkler has nozzles or jets directed against the conveyor 4. Below the sprinkler there is provided a guide plate 29 extended into the outlet region of the recooling zone 24.

Figure 2:
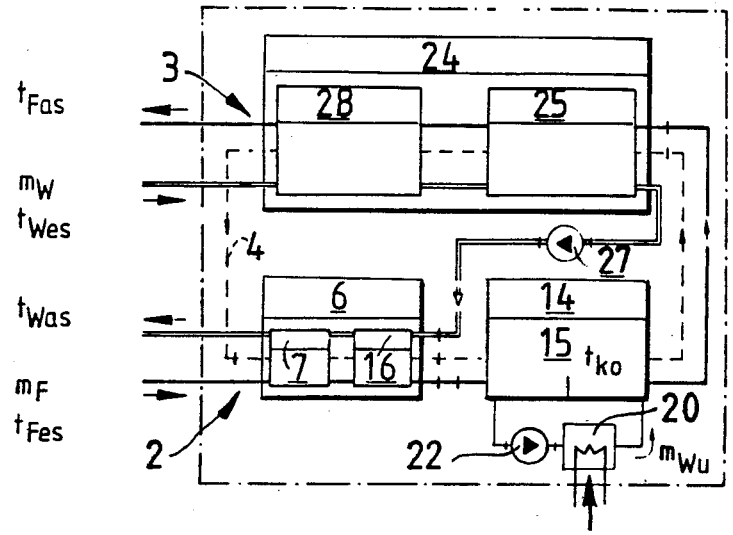
FIG. 2 shows a representation of the process by way of a block diagram.

The operation of the apparatus and the relationships of the procedural technique will be described in the following:

FIG. 2 is a symbolic representation of the relationships within the overall installation described by way of the apparatus. As can be seen more clearly herein, fresh water $m_W$ or appropriately conditioned water is supplied to the recooling zone 24 via the sprinkler 28 for initiating the operation, and it then flows to the outlet region of the trough 25. Whilst bypassing the boiling zone 14, the water flows from the trough 25 via the sprinkler 16 into the outlet region of the trough 7 of the preheating zone 6, in whose inlet region it can overflow and be discharged as waste water. The trough 15 located within the boiling zone 14 is filled with the heat carrier separately, and the latter is circulated with the aid of the circulating pump 22, so that the thermal energy supplied by the heat exchange means 20 is distributed homogeneously. As becomes apparent, this leads to a flow of the heat carrier water which is directed from the outlet zone 3 to the inlet zone 2 of the installation as a whole and therefore in a direction counter to the conveying direction of the treatment material. In order to enable the initiation of operation under conditions which at least approximately correspond to the conditions occurring in operation, a corresponding temperature rise can also be taken care of in the preheating zone 6 and in the recooling zone 24. During the passage of the foodstuffs to be treated, these are firstly exposed to the temperature of the preheating zone 6 and then enter the actual boiling zone 14 in correspondingly preheated form. For further handling, they are then cooled again on passing through the recooling zone 24. In this step, part of the thermal energy set free is transferred to the heat carrier present in this zone, so that as a result of the transfer into the preheating zone 6, its enthalpy can be used for preheating the foodstuffs to be treated.

Figures 3, 4:
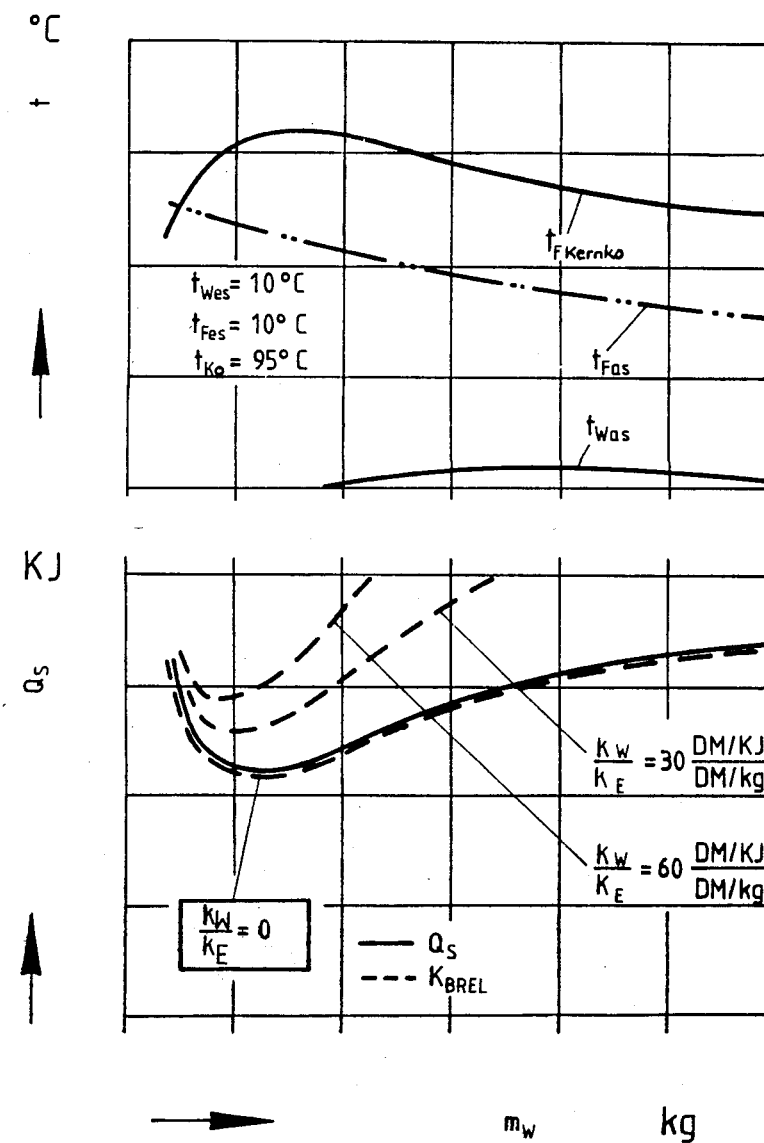
FIGS. 3 and 4 show the system behaviour by diagrammatically representing the functional relationships between the water demand and the temperature curve (gradient) in the heat carrier and in the foodstuffs to be treated, the energy demand and the relative operating costs when handling fish fillets as the treatment material.

By system analysis tests using a mathematical simulation of the system behaviour, one can prove that by modifying the circulating flow $m_{Wu}$ in the boiling zone 14 and the fresh water quantity $m_W$ supplied in the outlet zone 3 under otherwise fixed system parameters it is possible to influence the time pattern of the temperature profile in the foodstuffs to be treated and therefore to adapt it to predetermined technological and nutrition-physiological requirements. As a result of the use of the water being heated in the recooling zone 24 for raising the temperature of the foodstuffs to be treated material in the preheating zone 6, there is a simultaneous reduction in the energy demand for the boiling process compared with systems without preheating and recooling. Among other things, this fact can be followed by means of the diagrams of FIG. 3 and 4 drawn up using fish fillets as the treatment material. The symbols and subscripts used have the following meanings:

| Symbols: | m | Mass |
|---|---|---|
| | Q | Energy |
| | t | Temperature |
| | K | Costs |
| Subscripts: | F | Fish fillets |
| | W | Water |
| | a | Outlet |

| -continued | | |
|---|---|---|
| | e | Inlet |
| | s | System |
| | ko | boil |
| | w | preheat |

For the energy demand $Q_s$ to be supplied in the form of heat, the Q-m diagram shows a pattern (curve) which is dependent on the water quantity $m_W$ flowing through, which pattern in the case of increasing water quantity has an initially descending and then a gradually rising tendency. In accordance with the different local circumstances regarding the cost ratio of water costs $K_W$ to energy costs $K_E$ this leads to a relative operating costs demand $K_{Brel}$ corresponding to the broken group of curves, the top curve having to be associated to a high ratio value between the water costs $K_W$ and energy costs $K_E$, whereas the bottom curve corresponds to a ratio value obtained at $K_W=0$. The resulting temperature gradients (marches of temperature) attainable in the described apparatus and in the treated fish fillets are shown in the t-m diagram, in which the core temperature $t_{Fkernko}$ in the fillets is in accordance with the correspondingly designated curve and the average discharge temperature of the fillets corresponds to the curve $t_{Fas}$. The waste water temperature is in accordance with the curve $t_{Was}$. The represented conditions are obtained when using the following basic parameters:

| | |
|---|---|
| Residence time in the preheating zone 6 | 600 s |
| Residence time in the boiling zone 14 | 1500 s |
| Residence time in the recooling zone 24 | 600 s |
| (total treatment time consequently | 2700 s) |
| Water quantity circulated in the boiling zone 14 | 2.5 kg per fillet |
| for an average fillet thickness of 0.045 m | |
| Fresh water temperature | 10° C. |
| Fillet inlet temperature | 10° C. |
| Temperature of the water supplied to the outlet region of the boiling zone 14 | 95° C. |

Figure 5:
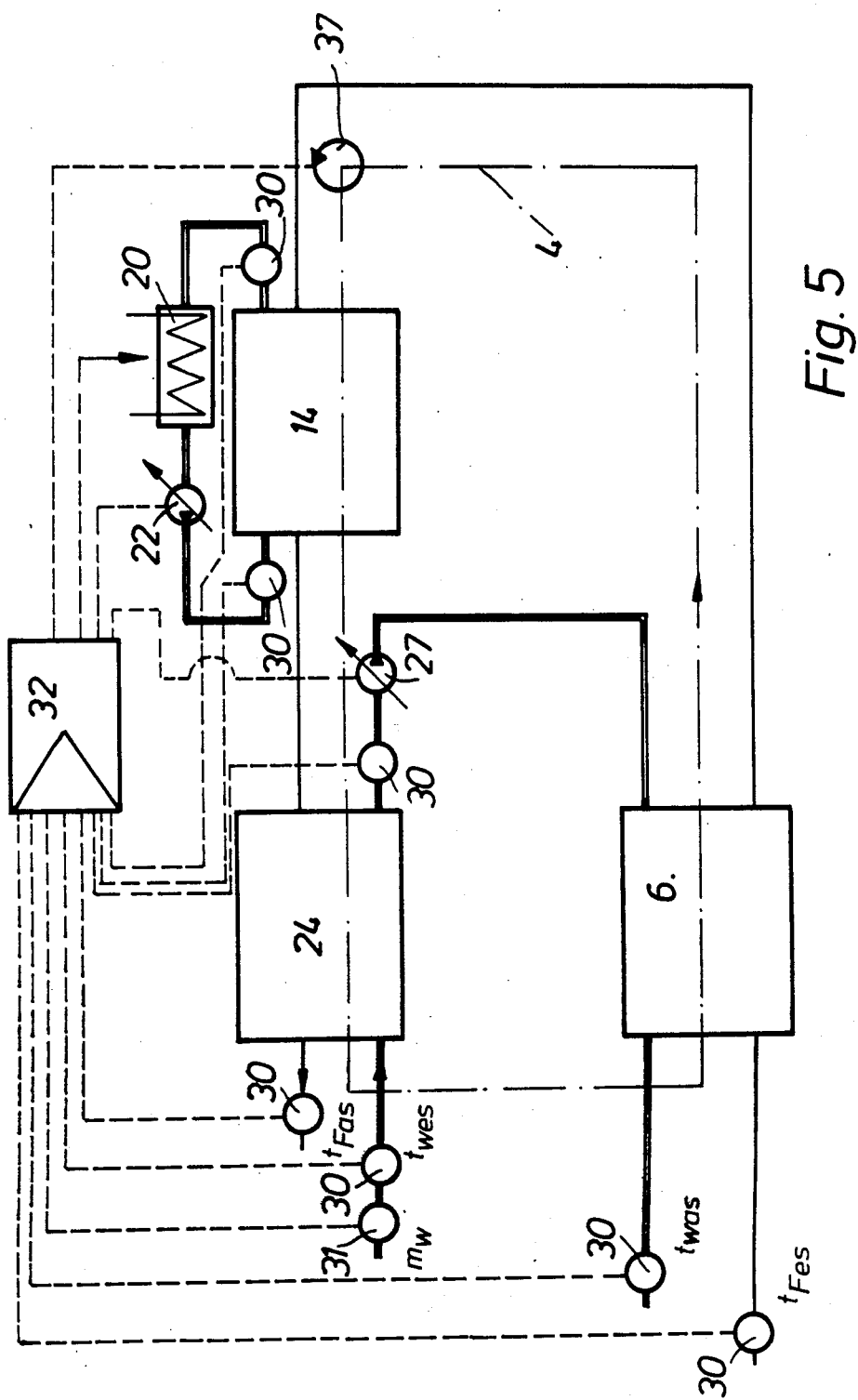
FIG. 5 shows a further embodiment of the invention.
Figure 6:
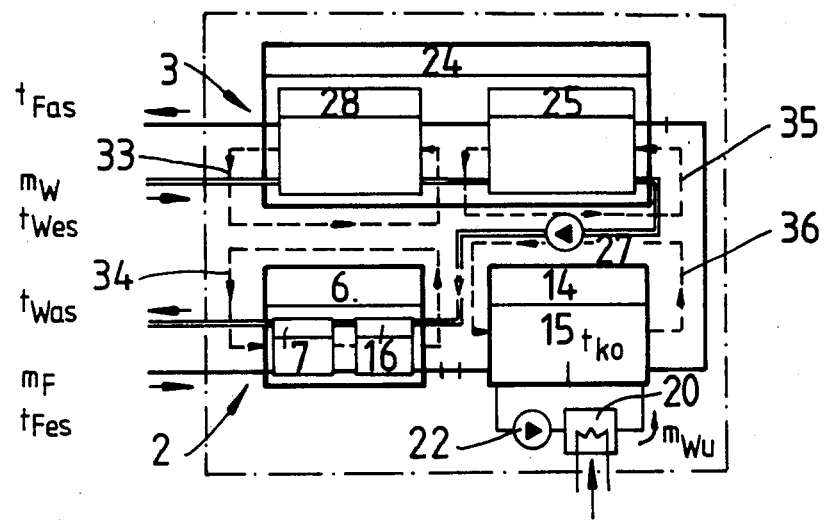
FIG. 6 shows a representation of the process similar to FIG. 2, wherein four conveyors are individually synchronously driven.

Referring now to FIG. 5, detection and controlling of the process may be performed automatically using presetable parameters. To this end, the feeding and discharging lines (pipes) of the preheating zone 6, the boiling zone 14 and the recooling zone 24 are provided with known temperature measuring devices such as, for example, thermometers 30, whereas the fresh water supply $m_W$ comprises a known volume flow measuring device such as, for example, meter 31. The conveying pump 27 and the circulating pump 22 are preferably variable capacity pumps. Conveyor 4 may also be controlled at a variable speed by a variable-speed motor 37. Heat exchange means 20 is also controllable. Measured data is supplied to a computer unit 32, programmed with the predetermined parameters. Computer unit 32 corrects errors in parameters measured by the control elements.

As becomes apparent, for the operation of the apparatus according to the invention using a predetermined fresh water supply with a minimum energy demand $Q_s$ the at least roughly maximum temperature can be obtained in the fillets and it also becomes clear that a quality-improving reduction of the maximum temperature drop between the surface and core of the fillets results thereby.

Thus, the described apparatus can e.g. be operated under optimum energy conditions if only a monitoring of the inflow of the fresh water quantity is performed.

What is claimed is:

1. Apparatus for continuously processing foodstuffs for the purpose of at least one of boiling and dewatering them under atmospheric pressure by contact with a heat carrier in the form of water, said apparatus comprising an installation having a preheating zone, a boiling zone and a recooling zone, each of which zones is arranged separately and has an inlet region and an outlet region, and in which zones troughs are installed, each being provided with chambers and traversed by means for conveying said foodstuffs, heat exchange means for transferring the thermal energy to be supplied to said heat carrier, means for supplying and removing said heat carrier and means for conveying said heat carrier within said installation, wherein said means for supplying said heat carrier are provided in said outlet region of said recooling zone and said means for removing said heat carrier are provided in said inlet region of said preheating zone, said inlet region of said recooling zone is connected with said outlet region of said preheating zone by pipe conduct means, in which is intermediately arranged a feed pump as means for supplying said heat carrier and controlled in accordance with the supply quantity of said heat carrier into said recooling zone, and said heat exchange means are installed in said boiling zone.

2. Apparatus as claimed in claim 1, wherein sprinklers (showers) are provided for supplying said heat carrier to said recooling zone and for transferring said heat carrier removed from said recooling zone into said preheating zone, which sprinklers sprinkle said foodstuff to be treated on all sides.

3. Apparatus as claimed in claim 1, wherein a side chamber receiving said heat exchange means is arranged in said inlet region of said boiling zone, which side chamber is connected with circulating pump means for removing said heated heat carrier and for supplying the same into said outlet region of said boiling zone, and which side chamber is further connected to said inlet region of said boiling zone via an overflow.

4. Apparatus as claimed in claim 2, wherein a side chamber receiving said heat exchange, means is arranged in said inlet region of said boiling zone, which side chamber is connected with circulating pump means for removing said heated heat carrier and for supplying the same into said outlet region of said boiling zone, and which side chamber is further connected to said inlet region of said boiling zone via an overflow.

5. Apparatus as claimed in claim 1, wherein means for discharging solids are provided at least in said outlet region of said boiling zone.

6. Apparatus as claimed in claim 4, wherein means for discharging solids are provided at least in said outlet region of said boiling zone.

7. Apparatus as claimed in claim 1, wherein said means for feeding said foodstuffs to be treated comprise driven, endlessly circulating conveyor means, passing through all of said treatment zones.

8. Apparatus as claimed in claim 6, wherein said means for feeding said foodstuffs to be treated comprise driven, endlessly circulating conveyor means, passing through all of said treatment zones.

9. Apparatus as claimed in claim 1, wherein said means for conveying said foodstuffs include individual synchronously driven conveyors separately associated with said individual treatment zones, passing through the latter, and circulating endlessly.

10. Apparatus as claimed in claim 6, wherein said means for conveying said foodstuffs include individual synchronously driven conveyors separately associated with said individual treatment zones, passing through the latter, and circulating endlessly.

11. Apparatus as claimed in claim 1, wherein controlling means are provided for controlling said feed pump with respect to its capacity, said heat carrier supply with respect to the flow rate thereof, and said means for conveying said foodstuffs to be treated with respect to their speed.

12. Apparatus as claimed in claim 8, wherein controlling means are provided for controlling said feed pump with respect to its capacity, said heat carrier supply with respect to the flow rate thereof, and said means for conveying said foodstuffs to be treated with respect to their speed.

13. Apparatus as claimed in claim 10, wherein controlling means are provided for controlling said feed pump with respect to its capacity, said heat carrier supply with respect to the flow rate thereof, and said means for conveying said foodstuffs to be treated with respect to their speed.

14. Apparatus as claimed in claim 1, wherein detection means are provided for detecting the flow rate of said heat carrier, the thermal energy supplied, the inlet and outlet temperatures of said heat carrier in said boiling zone and the speed of said means for conveying said foodstuffs to be treated, thus producing data which are supplied as process data to computer means, which control the treatment process in accordance with a predetermined optimization program with regard to minimizing operation costs, use being made of a predetermined reference value for at least one of the temperature difference in said boiling bath and of the throughput represented by the speed of said means for conveying said foodstuffs to be treated as orientation parameters.

15. Apparatus as claimed in claim 11, wherein detection means are provided for detecting the flow rate of said heat carrier, the thermal energy supplied, the inlet and outlet temperatures of said heat carrier in said boiling zone and the speed of said means for conveying said foodstuffs to be treated, thus producing data which are supplied as process data to computer means, which control the treatment process in accordance with a predetermined optimization program with regard to minimizing operation costs, use being made of a predetermined reference value for at least one of the temperature difference in said boiling bath and of the throughput represented by the speed of said means for conveying said foodstuffs to be treated as orientation parameters.

16. Apparatus as claimed in claim 12, wherein detection means are provided for detecting the flow rate of said heat carrier, the thermal energy supplied, the inlet and outlet temperatures of said heat carrier in said boiling zone and the speed of said means for conveying said foodstuffs to be treated, thus producing data which are supplied as process data to computer means, which control the treatment process in accordance with a predetermined optimization program with regard to minimizing operation costs, use being made of a predetermined reference value for at least one of the temperature difference in said boiling bath and of the throughput represented by the speed of said means for conveying said foodstuffs to be treated as orientation parameters.

17. Apparatus as claimed in claim 13, wherein detection means are provided for detecting the flow rate of said heat carrier, the thermal energy supplied, the inlet and outlet temperatures of said heat carrier in said boiling zone and the speed of said means for conveying said foodstuffs to be treated, thus producing data which are supplied as process data to computer means, which control the treatment process in accordance with a predetermined optimization program with regard to minimizing operation costs, use being made of a predetermined reference value for at least one of the temperature difference in said boiling bath and of the throughput represented by the speed of said means for conveying said foodstuffs to be treated as orientation parameters.

18. Apparatus as claimed in claim 1, wherein heat exchange means are provided in each one of said treatment zones.

19. Apparatus as claimed in claim 16, wherein heat exchange means are provided in each one of said treatment zones.

20. Apparatus as claimed in claim 17, wherein heat exchange means are provided in each one of said treatment zones.

* * * * *